UNITED STATES PATENT OFFICE.

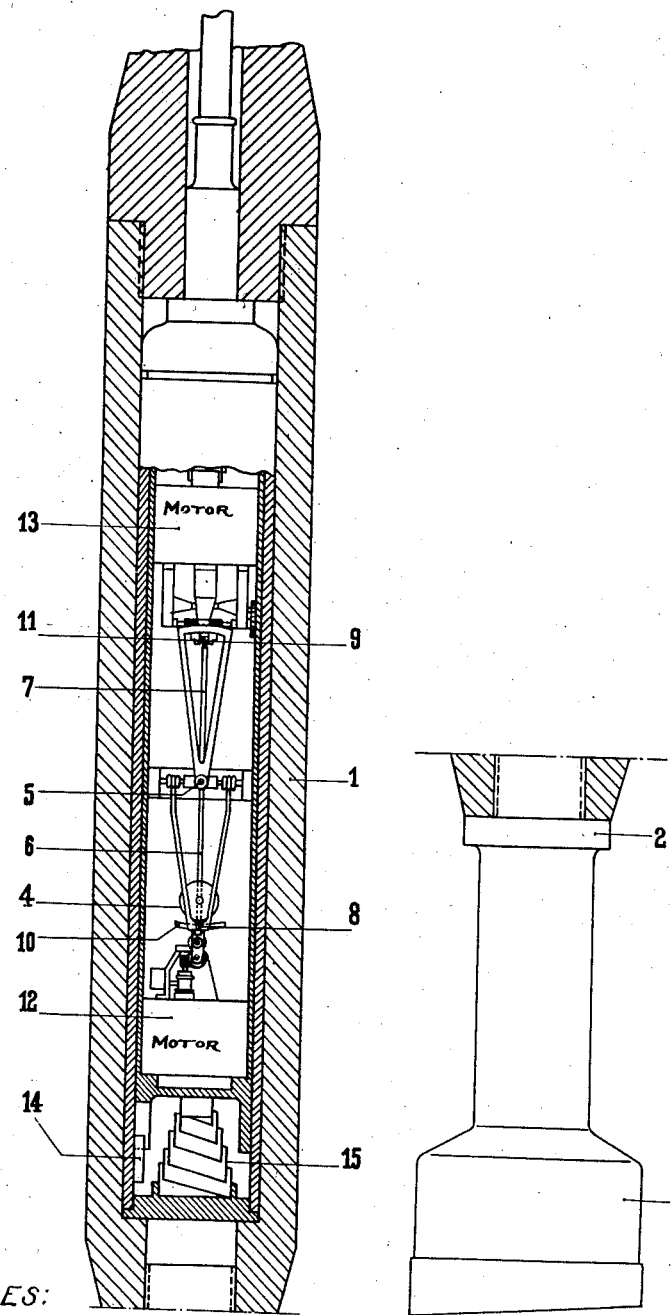

HERMANN ANSCHÜTZ-KAEMPFE, OF NEUMUHLEN, NEAR KIEL, GERMANY, ASSIGNOR TO ANSCHUTZ & CO., OF NEUMUHLEN, NEAR KIEL, GERMANY.

BORING DEVICE AND METHOD FOR THE PRODUCTION OF VERTICAL BOREHOLES.

1,411,896.          Specification of Letters Patent.      Patented Apr. 4, 1922.

Application filed February 24, 1916. Serial No. 80,136.

*To all whom it may concern:*

Be it known that I, Dr. HERMANN ANSCHÜTZ-KAEMPFE, a subject of the Emperor of Germany, and a resident of Neumuhlen, near Kiel, Germany, have invented certain new and useful Improvements in Boring Devices and Methods for the Production of Vertical Boreholes, of which the following is a specification.

It is known that bore holes sunk by the refrigeration method and required for sinking shafts, are almost never exactly vertical in the ground, but deviate slightly therefrom. These departures from the vertical are generally very small at first, but increase rapidly with depth, as a result of which bore holes which have been laid on the surface in a circle, e. g., lie irregularly at great depths. In such case, distances between bore holes are frequently too large to ensure overlapping of the frozen zones.

In order to sink shafts successfully by the refrigerating method, it has therefore been necessary, hitherto, to ascertain accurately the position of the finished bore holes, by introducing a measuring instrument designed for the purpose, and in the event of considerable deviations being found, to sink an entire series of new bore holes, the positions of which had again to be ascertained, until the desired zones of freezing were obtained. It was impossible to correct subsequently any bore holes which had been found incorrect.

The disadvantages referred to are obviated according to this invention which relates to a boring tool and to a method for the production of vertical bore holes, such that any departures of the bore holes from the vertical can be immediately ascertained during boring and at once corrected by a corresponding suitable control of the boring tool, so that the finished bore holes are, in general, much more accurately vertical than was the case hitherto, and a final checking up and correction becomes unnecessary.

The object of the invention is to provide an improved method of sinking vertical bore holes and an improved boring device free of the enumerated disadvantages and capable of being controlled so as to make bore holes which are, at all times, accurately vertical.

My invention will be better understood by referring to the accompanying drawing where a preferred embodiment of the improved boring tool is diagrammatically illustrated. In this drawing 1 is the bottom end of a bar carrying the boring bit. The said bar is hollow and contains the pendulum later to be described; at its bottom end is mounted the boring head 2 to which is secured the boring bit 3, the cutting edge of which is ground somewhat aslant so that one end $a$ of the cutting edge is at a lower level than the other. A pendulum having a pendulum rod 6, carrying a weight 4, and an upwardly extending rod 7 is suspended from the point 5 which forms part of a Cardan joint. The two rods 6 and 7 terminate in contact balls 8 and 9. The ball 8 is arranged between two parallel contact tracks 10, but is out of contact with both when the boring bar is accurately vertical. The contact tracks can be jointly moved normally to the plane of the paper by means of an electric motor 12. Their distance apart is not modified thereby being always constant, but either the one or the other, according to the direction of the movement, comes into contact with the contact ball 8. This results in the closing and opening of circuits of the motor 12 in such a way that the contact tracks will always follow the movement of the ball 8, in as far as it takes place normally to the plane of the drawing. As soon as the ball 8 is again between the contact tracks 10 without being in contact with either of them, the track actuating circuit of the motor 12 is completely open and the movement of the tracks will cease.

Exactly the same arrangement is provided for the ball 9, contact tracks 11 and motor 13, with the only difference that the movement of the ball 9 and of the tracks 11 are in the plane of the drawing, instead of normal thereto. The result of the arrangement described is therefore that the rotations of the motors 12 and 13 supply a measure, in rectangular co-ordinates, for any inclination of the hollow heavy bar 1 relatively to the vertical.

Instead of a single pendulum, there could be provided two independent pendulums, each measuring a single component of the deviation.

In order that the position of the pendulum may be affected as little as possible by the shocks of the blows imparted to the boring bar and bit, I prefer to secure the entire pendulum device, with its motors, to a sliding carriage adjustable in the longitudinal direction of the bar and provided with springs 15 or pads of rubber or the like, forming a buffer between the carriage and the bar.

The rotation of motors 12 and 13 drives in known manner, electrically, continuous current motors which reproduce, in suitable apparatus at the ground surface, the position of the pendulum resolved into two coordinates. The details of this arrangement are immaterial to this invention, and have been already described by the inventor in United States Patent No. 1,209,102 granted to him under date of December 19, 1916 and entitled "Deviations of bore holes".

As long as the bore bar, and hence the bore hole remains exactly vertical the pendulum will also be vertical and the indicating apparatus at the ground surface will stand at zero. In this case, the boring rod and, hence the boring bit should be uniformly rotated, so that the bevelled cutting edge of the bit will produce a cone on the bottom of the bore hole and will not favour any departure from the vertical. In the event however of such a departure nevertheless appearing, it will be indicated on the surface by the indicating apparatus. The rotatory movement of the boring bar and bit should therefore no longer be continuous but should be restricted to an arc substantially less than 360°, preferably to an arc of about 180°, through which arc the bar and bit should rotate, now in one direction, now in the opposite direction; that will cause the bottom of the bore hole to be made deeper at one side than at the other. The bit will then have a tendency to slip towards that side, and this will produce, as the depth increases, a lateral shifting of the bore hole in that direction. This will be continued until the indicating apparatus on the surface shows that the bore hole has again assumed a vertical direction.

Having described my invention, I claim:

1. A boring tool comprising a hollow bar, and a pendulum enclosed and freely suspended within said bar, said bar being adapted to have its deviations with respect to the pendulum automatically indicated at the ground surface, said bar having, further, an attached boring bit with a cutting edge which is inclined with respect to the axis of the bar.

2. A boring tool comprising a hollow bar, a pendulum enclosed and freely suspended within said bar, means for automatically transmitting to a distance the deviations of the bar with respect to the pendulum, and a cutting edge at the bottom of said bar said edge being inclined with respect to the axis of the bar.

3. A boring tool comprising a hollow bar, a freely suspended pendulum slidably enclosed within said bar, means for automatically transmitting to a distance the deviations of the bar with respect to the pendulum, a cutting edge at the bottom of said bar said edge being inclined with respect to the axis of the bar, and a buffer between the pendulum and the bar for protecting the pendulum from shocks received by the bar.

4. The method of sinking vertical bore holes with a boring bar having a bit with an inclined cutting edge which comprises rotating the bar and bit continuously as long as the bar remains vertical and, when the bar deviates from the vertical, causing the bar and bit to be reciprocally rotated through a suitable arc until the verticality of the bar and bit is restored.

5. A boring tool comprising a bar, a bit held by said bar and having an edge inclined with respect to the axis of the bar, a pendulum carried by said bar and movable pivotally in a vertical plane with respect to the bar, and means for indicating at a distance from the pendulum the position of the bar relative to the pendulum.

6. A boring tool comprising a bar, a bit held by said bar and having an edge inclined with respect to the axis of the bar, a universally pivoted pendulum carried by said bar and means for indicating at a distance from the pendulum the position of said pendulum relative to the bar.

7. A boring tool comprising a bar, a bit held by said bar and having an edge inclined with respect to the axis of the bar, a gravity controlled element controlled by and movable with respect to the bar to indicate vertical and inclined positions of the bar.

8. A boring tool comprising a bar, a bit held by said bar and having an edge inclined with respect to the axis of the bar, a gravity controlled element controlled by and movable with respect to the bar to indicate vertical and inclined positions of the bar, and means for indicating at a distance from said gravity controlled element its position with respect to the bar.

In witness whereof I have hereunto signed my name this 26th day of January 1916, in the presence of two subscribing witnesses.

Dr. HERMANN ANSCHÜTZ-KAEMPFE.

Witnesses:
  WOLFGANG OTTO,
  MATTHEW SHÄFER.